US006510891B2

(12) United States Patent
Anderson et al.

(10) Patent No.: US 6,510,891 B2
(45) Date of Patent: Jan. 28, 2003

(54) CLIP-RETAINER FOR HEAT EXCHANGER

(75) Inventors: Dana L. Anderson, Sterling Hts., MI (US); Richard Victor Cooper, Jr., Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/844,085

(22) Filed: Apr. 27, 2001

(65) Prior Publication Data

US 2002/0157812 A1 Oct. 31, 2002

(51) Int. Cl.$^7$ ................................................ F28F 9/007
(52) U.S. Cl. ................. 165/67; 165/121; 165/140; 180/68.4
(58) Field of Search ................. 165/67, 140, 178; 180/68.4, 121

(56) References Cited

U.S. PATENT DOCUMENTS 5,269,367 A * 12/1993 Susa et al. ................. 165/140
5,271,473 A * 12/1993 Ikeda et al. ................ 180/68.4
5,996,684 A * 12/1999 Clifton et al. .............. 165/121
6,073,594 A * 6/2000 Tsukiana et al. ......... 123/41.33

* cited by examiner

Primary Examiner—Allen Flanigan
(74) Attorney, Agent, or Firm—Patrick M. Griffin

(57) ABSTRACT

A heat exchanger assembly including a condenser assembly, a radiator assembly, a fan shroud, and a clip for retaining the condenser assembly and a method of assembly. The clip includes a base, a first engaging portion, a second engaging portion and a locking portion. The base has a first end and a second end, a top and a bottom side. The first portion extends from the bottom side of the base having a first flange and a second flange. The first and second flange form a channel along the first end of the base. The second engaging portion extends from the bottom side of the base along the second end of the base. The locking portion extends from the top side of the base.

10 Claims, 3 Drawing Sheets

CLIP-RETAINER FOR HEAT EXCHANGER

BACKGROUND OF THE INVENTION

1. Technical Field

This invention generally relates to condenser, radiator, fan module (CRFM) and, more particularly, to a CRFM with an improved assembly process and improved accessibility for service.

2. Background of the Invention

Most motor vehicles now have two major heat exchangers, a radiator used to dissipate heat from the engine and a condenser forming part of the air conditioner. Such vehicles utilize a variety of attachment methods by which to attach the fan shroud, radiator and condenser to one another and to the vehicle. Such attachment methods include spring clips, brackets, J-nuts, screws and an array of auxiliary parts. Due to vibrations caused by normal operation of the vehicle, the aforementioned attached methods are susceptible to loosening and backing off from their tightened and secured positions. This leads to a loosening of parts and therefore, a need for maintenance. The myriad of fasteners and auxiliary parts utilized can cause inefficiencies or increases in the material and labor cost involved in such an assembly.

In order to gain access to or remove the radiator for service, typically, the fan shroud must be removed and the condenser separated from the radiator. This can be difficult and inefficient due to space limitations. It is also desirable to separate the radiator and condenser without damaging any of the refrigerant lines.

The present invention is aimed at one or more of the problems identified above.

SUMMARY OF THE INVENTION

In one aspect of the present invention, a clip for retaining a condenser assembly of a heat exchanger is provided. The heat exchanger includes the condenser assembly, a radiator assembly, and a fan shroud. The clip includes a base, a first engaging portion, a second engaging portion and a locking portion. The base has a first side and a second side, a top and a bottom. The first engaging portion extends from the bottom of the base and includes a first flange and a second flange. The first and second flange form a channel along the first side of the base. The second engaging portion extends from the bottom of the base along the second side of the base. The locking portion extends from the top of the base.

In another aspect of the present invention, a method for assembling a heat exchanger assembly is provided. The heat exchanger assembly includes a condenser assembly, a radiator assembly, and a fan shroud. The fan shroud includes a hold down structure. The method includes the steps of removably coupling the condenser assembly to the radiator assembly through relative vertical movement and fixing the vertical position of the condenser assembly relative to the radiator assembly by installing a clip retainer between the condenser assembly and the radiator assembly. The method further includes the steps of mounting the fan shroud to the radiator assembly and maintaining a locking relationship between the hold down structure and clip retainer.

DETAILED DESCRIPTION OF THE PREFERRED EMBODIMENT

With reference to the drawings and in operation, the present invention provides a heat exchanger assembly 102 for a motor vehicle (not shown) and a method of assembling the heat exchanger assembly 102.

The heat exchanger assembly 102 includes a radiator assembly 104, a condenser assembly 106 and a fan shroud 108. The radiator assembly 104, the condenser assembly 106 and fan shroud 108 are jointly referred to as a condenser-radiator-fan module (CRFM). The structure and operation of a CRFM is well known in the art and is therefore not further discussed.

Figure 2A:
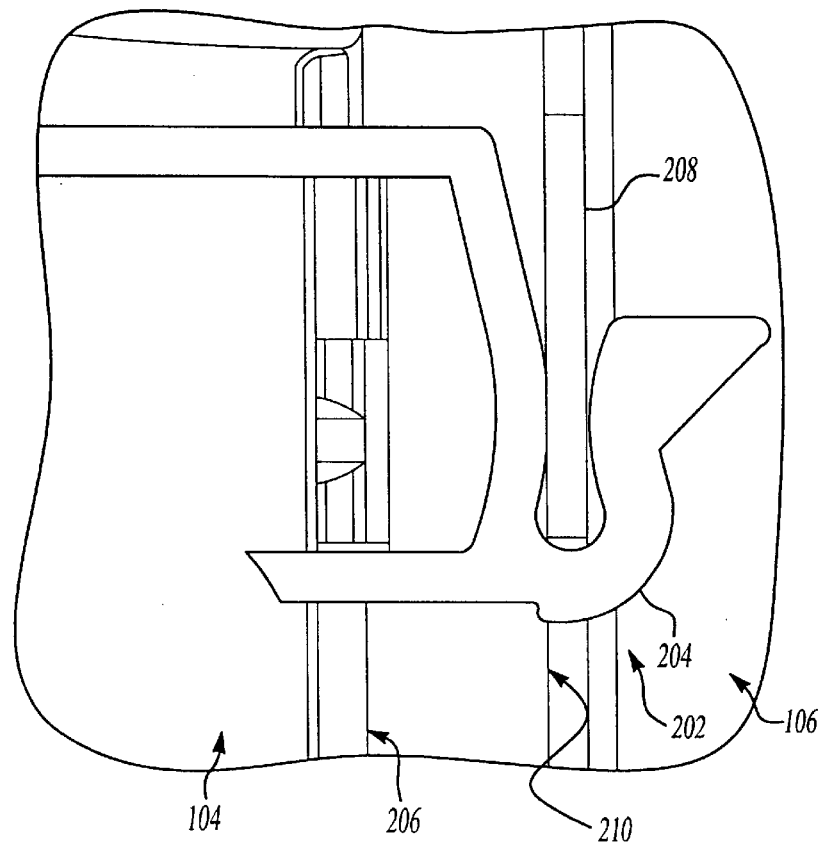
FIG. 2A is a diagrammatic representation of a side view of a fastening assembly for coupling the condenser assembly to the radiator assembly of FIG. 1, according to an embodiment of the present invention.
Figure 2B:
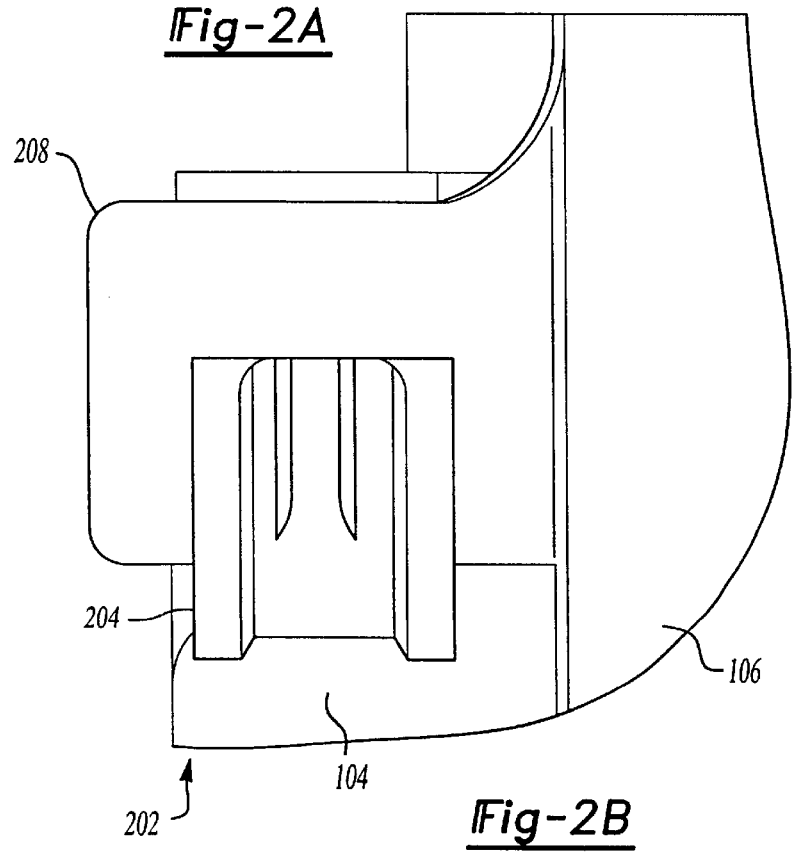
FIG. 2B is a diagrammatic representation of a front view of the fastening assembly of FIG. 2A, according to an embodiment of the present invention.

The condenser assembly 106 is removably coupled to the radiator assembly 104 through relative vertical movement. The condenser assembly 106 is coupled to the radiator assembly 104 without the use of removable fasteners (such as screws). With reference to FIGS. 2A and 2B in the preferred embodiment, a fastener assembly 202 includes four clips 204 (only one of which is shown) molded to the front surface 206 of the radiator assembly 104. The clip 204 preferably extends upward. The fastener assembly 202 further includes four mounting tabs 208 (only one of which is shown) coupled to the back surface 210 of the condenser assembly 106. To install the condenser assembly 106 relative to the radiator assembly 104, the condenser assembly 106 is lifted and adjusted until the mounting tabs 208 are in position above the clips 204. The condenser assembly 106 is then moved in a downward direction to engage the clips 204. Preferably, the clips 104 are integrally molded out of plastic with portions of the radiator assembly 104. Preferably, the mounting tabs 208 are integrally formed from aluminum with portions of the condenser assembly 106.

Figure 3:
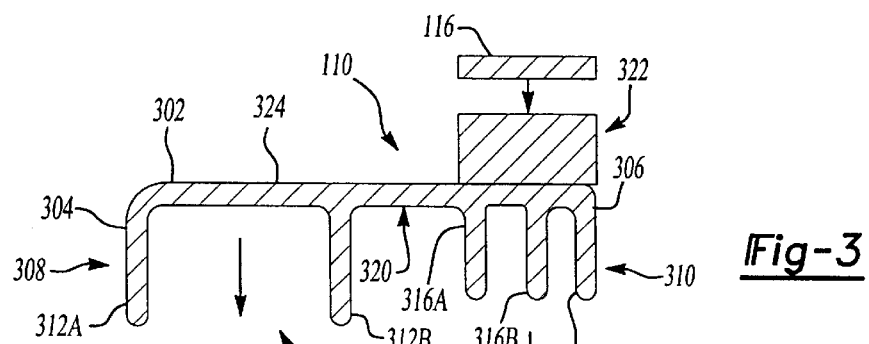
FIG. 3 is a diagrammatic representation of a side view of the clip of FIG. 1 and partial views of the condenser assembly, radiator assembly, and fan shroud in an unassembled condition, according to an embodiment of the present invention.

The heat exchanger assembly 102 includes a clip retainer 110. With reference to FIG. 3, the clip retainer 110 includes a base 302 with a first end 304 and a second end 306. A first engaging portion 308 extends from the first end 304 of the base 302. A second engaging portion 310 extends from the second end of the base 302.

Figure 4:
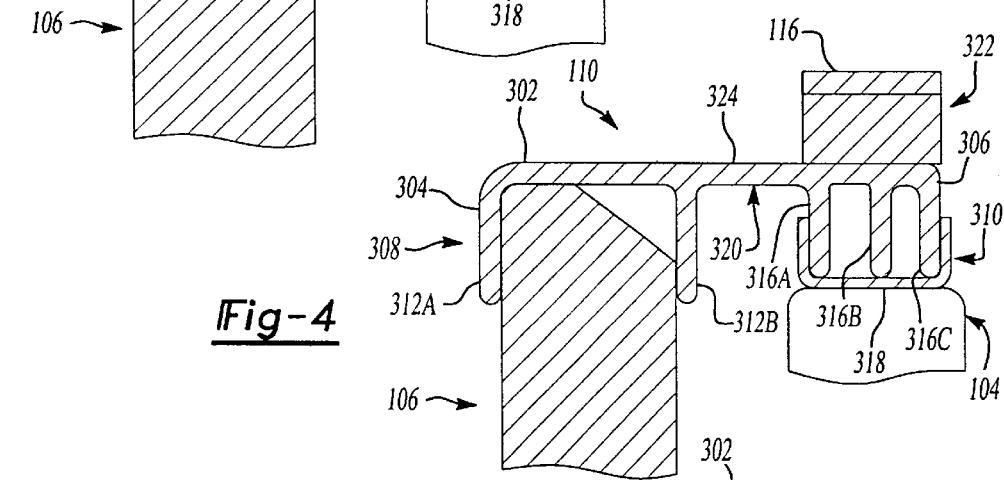
FIG. 4 is a diagrammatic representation of a side view of the clip of FIG. 1 and partial views of the condenser assembly, radiator assembly, and fan shroud in an assembled condition, according to an embodiment of the present invention.

As shown in FIG. 4, when assembled, the first engaging portion 308 is in an engaging relationship with the condenser assembly 106 and the second engaging portion 310 being in an engaging relationship with the radiator assembly 104.

Preferably, the first engaging portion 308 includes first and second flanges 312A, 312B, forming a first U-shaped channel 314 for coupling the clip retainer 110 with the condenser assembly 106.

The second engaging portion 310 includes third, fourth, and fifth flanges 316A, 316B, 316C. Preferably, a second U-shaped channel 318 mounted to the radiator assembly 104 is adapted to receive the second engaging portion 310.

The clip retainer 110 preferably includes a middle portion 320 located between the first and second engaging portions 308, 310 for maintaining a relative distance between the radiator assembly 104 and the condenser assembly 106.

The clip retainer 110 further includes a locking portion 322 which extends from the top 324 of the base 302.

Preferably, the clip retainer 110 is composed of a suitable plastic or nylon material, e.g., a 6.6 25% glass reinforced nylon material.

Figure 5:
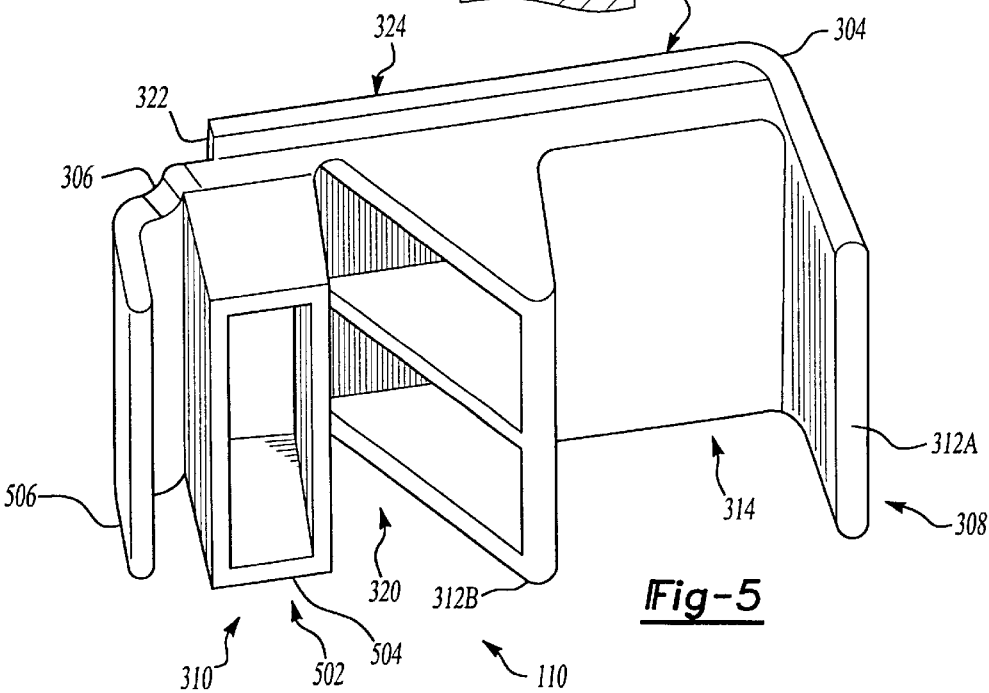
FIG. 5 is a three dimensional view of the retaining clip of FIG. 1, according to an embodiment of the present invention; and, FIG. 6 is a three dimensional view of the retaining clip of FIG. 1, according to another embodiment of the present invention.

With reference to FIG. 5, a three-dimensional view of the clip retainer 110 is shown where the second engaging portion 310 comprises an extension 502 from the base 302. The extension 502 includes third and fourth flanges 504, 506.

Figure 1:
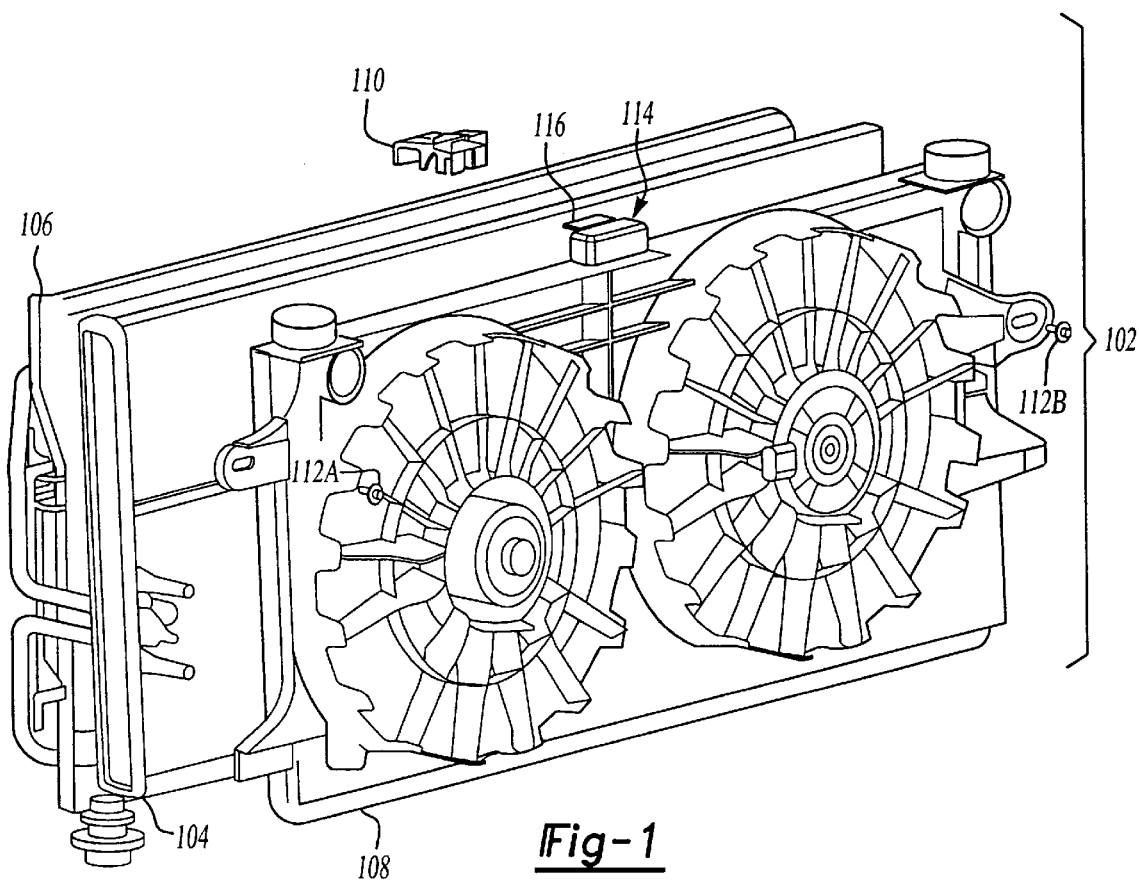
FIG. 1 is a diagrammatic illustration of a heat exchanger having a condenser assembly, a radiator assembly, a fan shroud, and a retaining clip, according to an embodiment of the present invention.

Returning to FIG. 1, the fan shroud 108 is coupled to the radiator assembly 104 by clips (not shown) and screws 112A, 112B. The fan shroud 108 includes a hold down structure 114. In one embodiment, the hold structure 114 includes a tab 116. When the heat exchanger 102 is assembled, the tab 116 is in a hold down relationship with the locking portion 322 of the clip retainer 110.

Returning to FIGS. 3 and 4, the tab 116 is positioned over the locking portion 322. When the shroud is positioned and secured in place, the tab 116 retains the clip 110 in position which prohibits the condenser 106 from moving upward relative to the radiator assembly 104.

Figure 6:
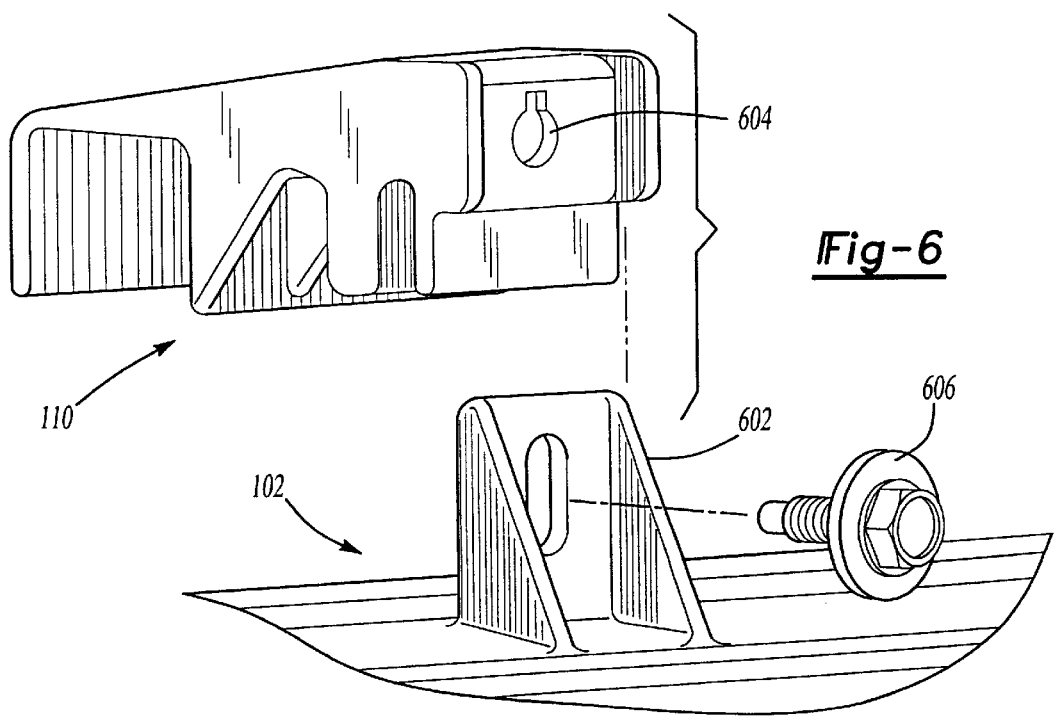

With reference to FIG. 6, in another embodiment, the hold structure 114 includes a fastener receiving member 602. The clip retainer 110 includes an fastener receiving aperture 604. A fastener 606 is inserted through the fastener receiving member 602 and into the fasteners receiving aperture 604, thereby securing the clip retainer 110 to the shroud secured to the fan shroud 108.

In order to service the radiator assembly 104, the fan shroud 108 must be removed. Once the fan shroud 108 is removed, the condenser 106, which is generally towards the front of the motor vehicle, can be de-coupled from the radiator assembly 104 by simply upward movement. It then can be laid forward, out of the way so that the radiator assembly 104 can be removed and/or serviced.

What is claimed is:

1. A heat exchanger assembly, comprising:

a radiator assembly;

a condenser assembly removably coupled to the radiator assembly through relative vertical movement;

a clip-retainer having a base with a first end and a second end, a first portion extending from the bottom side of the base and a second portion extending from the bottom side of the base, the first portion being in an engaging relationship with the condenser assembly and the second portion being in an engaging relationship with the radiator assembly, the clip retainer further including a locking portion extending from the top of the base;

a fan shroud coupled to the radiator assembly and having a hold down structure, the hold down structure being in a hold down relationship with the locking portion of the clip retainer.

2. A heat exchange assembly, as set forth in claim 1, wherein the hold down structure includes a tab extending over the locking portion of the clip retainer.

3. A heat exchange assembly, as set forth in claim 1, including a fastener inserted through a fastener receiving member of the fan shroud and being secured to the clip retainer.

4. A heat exchanger assembly, as set forth in claim 1, wherein the second engaging portion includes a plurality of flanges extending from the base.

5. A heat exchanger assembly, as set forth in claim 1, wherein the second engaging portion includes a single extension from the base.

6. A heat exchanger assembly, as set forth in claim 1, wherein the clip-retainer is composed of a nylon material.

7. A heat exchanger assembly, as set forth in claim 1, wherein the clip retainer is composed of glass reinforced nylon.

8. A heat exchanger assembly, as set forth in claim 1, wherein the clip includes a middle portion for maintaining a predetermined distance between the condenser assembly and the radiator assembly.

9. A heat exchanger assembly, as set forth in claim 1, wherein the condenser assembly is removably coupled to the radiator assembly by a fastener assembly.

10. A heat exchanger assembly, as set forth in claim 7, wherein the fastener assembly includes at least one upwardly extending clip coupled to the radiator assembly and at least one corresponding mounting tab coupled to the condenser assembly.

* * * * *